US012515921B2

(12) United States Patent
Kattainen et al.

(10) Patent No.: US 12,515,921 B2
(45) Date of Patent: Jan. 6, 2026

(54) ELEVATOR SYSTEM

(71) Applicant: Kone Corporation, Helsinki (FI)

(72) Inventors: Ari Kattainen, Helsinki (FI); Juha-Matti Aitamurto, Helsinki (FI)

(73) Assignee: Kone Corporation, Helsinki (FI)

(*) Notice: Subject to any disclaimer, the term of this patent is extended or adjusted under 35 U.S.C. 154(b) by 1302 days.

(21) Appl. No.: 17/231,604

(22) Filed: Apr. 15, 2021

(65) Prior Publication Data

US 2021/0339985 A1 Nov. 4, 2021

(30) Foreign Application Priority Data

Apr. 30, 2020 (EP) .................................... 20172426

(51) Int. Cl.
*B66B 19/00* (2006.01)
*B66B 1/34* (2006.01)
(Continued)

(52) U.S. Cl.
CPC .......... *B66B 19/007* (2013.01); *B66B 1/3461* (2013.01); *B66B 5/0031* (2013.01); *B66B 9/00* (2013.01); *B66B 13/24* (2013.01)

(58) Field of Classification Search
CPC ... B66B 19/007; B66B 1/3461; B66B 5/0031; B66B 9/00; B66B 13/24; B66B 1/3446;
(Continued)

(56) References Cited

U.S. PATENT DOCUMENTS

| | | | | |
|---|---|---|---|---|
| 10,214,383 | B2 * | 2/2019 | Sonnenmoser | H04L 41/22 |
| 10,554,443 | B2 * | 2/2020 | Sonnenmoser | H04L 12/4013 |

(Continued)

FOREIGN PATENT DOCUMENTS

| | | | |
|---|---|---|---|
| CN | 107250021 | A | 10/2017 |
| CN | 108367891 | A | 8/2018 |

(Continued)

OTHER PUBLICATIONS

Chinese Office Action dated Jul. 4, 2024 issued in corresponding Chinese Appln. No. 202110452204.9.

(Continued)

*Primary Examiner* — Jeffrey Donels
(74) *Attorney, Agent, or Firm* — Harness, Dickey & Pierce, P.L.C.

(57) ABSTRACT

An elevator safety system comprises an elevator system component, an actuator configured to cause a change in a status of the elevator system component, a data bus, a safety controller configured to communicate via the data bus, a sensor configured to detect the change in the status of the elevator system component where the detecting includes generating, at the sensor, information indicating the change in the status of the elevator system component, and an elevator system node associated with the sensor and configured to communicate the information indicating the change in the status of the elevator system component to the safety controller via the data bus. The safety controller is configured to link, in a memory of the safety controller and subsequently to the information being communicated to the safety controller, an address associated with the elevator system node with an identifier of the elevator system component.

14 Claims, 2 Drawing Sheets

(51) Int. Cl.
*B66B 5/00* (2006.01)
*B66B 9/00* (2006.01)
*B66B 13/24* (2006.01)

(58) Field of Classification Search
CPC ....... B66B 1/14; B66B 1/3415; B66B 1/3453; B66B 5/0018; H04B 3/60
See application file for complete search history.

(56) References Cited

U.S. PATENT DOCUMENTS

| | | | | |
|---|---|---|---|---|
| 2005/0098390 | A1* | 5/2005 | Angst | B66B 5/0018<br>187/247 |
| 2018/0162691 | A1* | 6/2018 | Herkel | B66B 5/0031 |
| 2019/0389694 | A1* | 12/2019 | Herkel | B66B 5/005 |
| 2019/0389695 | A1* | 12/2019 | Monzon | B66B 5/16 |
| 2020/0031620 | A1* | 1/2020 | Herkel | B66B 5/027 |
| 2021/0339977 | A1* | 11/2021 | Kattainen | B66B 1/3453 |
| 2023/0029130 | A1* | 1/2023 | Huszak | B66B 1/3423 |

FOREIGN PATENT DOCUMENTS

| | | | | |
|---|---|---|---|---|
| CN | 113581949 | A | 11/2021 | |
| EP | 1151952 | A2 | 11/2001 | |
| EP | 3333110 | A1 | 6/2018 | |
| EP | 3643666 | A1 * | 4/2020 | B66B 5/22 |

OTHER PUBLICATIONS

European Search Report for European Application No. 20172426 dated Oct. 14, 2020.

* cited by examiner

ELEVATOR SYSTEM

RELATED APPLICATIONS

This application claims priority to European Patent Application No. 20172426.7 filed on Apr. 30, 2020, the entire contents of which are incorporated herein by reference.

TECHNICAL FIELD

The present application relates to the field of elevator systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different communication stacks and multiple different physical layers may be used simultaneously. The use of multiple different internal data transmission solutions may result in a complicated and inefficient solution.

Traditionally different elevator system components have been connected to elevator control with their own wiring and dedicated connectors, such that the control interface is unique and self-explanatory. As a downside, this means that the interface may be complicated, requiring lot of cabling.

Also serial communication has been used for connecting landing fixtures to a same communication channel. In this case a simpler interface with less wiring has been achieved. However, this solution tends to be labor-intensive as those fixtures are to be configured manually such that their data can be identified from the common communication channel.

To use serial communication in an elevator communication system, it is important to be able to configure elements and system nodes in the elevator communication system easily and reliably. For example, when a safety sensor in the elevator communication system triggers, it is important to know the location of the safety sensor.

Thus, it would be beneficial to have a solution that would alleviate at least one of these drawbacks.

SUMMARY

According to a first aspect, there is provided a method for setting up an elevator safety system. The elevator safety system comprises an elevator system component, an actuator for causing a change in the status of the elevator system component, a data bus, a safety controller configured to communicate via the data bus, a sensor configured to indicate a change in the status of the elevator system component, and an elevator system node associated with the sensor configured to communicate via the data bus. The elevator system node is configured to communicate a change in the status of the elevator system component to the safety controller via the data bus. The method comprises causing, by the actuator, a change in the status of the elevator system component; detecting, with the sensor, a change in the status of the elevator system component; communicating with the elevator system node the changed status to the safety controller via the data bus; and linking, in a memory of the safety controller, an address associated with the elevator system node with an identifier of the elevator system component.

In an implementation form of the first aspect, the elevator system component comprises one of a hoisting machine, a hoisting machine brake, a car brake, a brake control unit, a landing door, a car door, a pit buffer, an overspeed governor, and a pre-triggered safety device.

In an implementation form of the first aspect, the actuator comprises one of a hoisting motor, an electromagnet of a hoisting machine brake, and a door operator and a manual actuator.

In an implementation form of the first aspect, the sensor comprises one of a current sensor, a voltage sensor, an encoder, an inductive proximity sensor, a hall sensor, a reed switch, and a safety contact.

In an implementation form of the first aspect, the identifier comprises an address of the elevator system component.

In an implementation form of the first aspect, the data bus comprises an ethernet bus.

In an implementation form of the first aspect, the elevator communication system further comprises at least one multi-drop ethernet bus segment communicatively connected to the data bus and wherein the data bus comprises a point-to-point ethernet bus, wherein the elevator system node is communicatively connected to the ethernet bus via the at least one multi-drop ethernet bus segment.

According to a second aspect, there is provided an elevator safety system. The elevator safety system comprises an elevator system component, an actuator for causing a change in the status of the elevator system component, a data bus, a safety controller configured to communicate via the data bus, a sensor configured to indicate a change in the status of the elevator system component, and an elevator system node associated with the sensor configured to communicate via the data bus. The elevator system node is configured to communicate a change in the status of the elevator system component to the safety controller via the data bus. The actuator is configured to cause a change in the status of the elevator system component, the sensor is configured to detect a change in the status of the elevator system component, the elevator system node is configured to communicate the changed status to the safety controller via the data bus, and the safety controller is configured to link in a memory of the safety controller an address associated with the elevator system node with an identifier of the elevator system component.

In an implementation form of the second aspect, the elevator system component comprises one of a hoisting machine, a hoisting machine brake, a car brake, a brake control unit, a landing door, a car door, a pit buffer, an overspeed governor, and a pre-triggered safety device.

In an implementation form of the second aspect, the actuator comprises one of a hoisting motor, an electromagnet of a hoisting machine brake, and a door operator.

In an implementation form of the second aspect, the sensor comprises one of a current sensor, a voltage sensor, an encoder, an inductive proximity sensor, a hall sensor, a reed switch, and a safety contact.

In an implementation form of the second aspect, the identifier comprises an address of the elevator system component.

In an implementation form of the second aspect, the data bus comprises an ethernet bus.

In an implementation form of the second aspect, the elevator communication system further comprises at least one multi-drop ethernet bus segment communicatively connected to the data bus and wherein the data bus comprises a point-to-point ethernet bus, wherein the elevator system node is communicatively connected to the ethernet bus via the at least one multi-drop ethernet bus segment.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

In an example embodiment, the various embodiments discussed below may be used in an elevator system comprising an elevator that is suitable and may be used for transferring passengers between landing floors of a building in response to service requests. In another example embodiment, the various embodiments discussed below may be used in an elevator system comprising an elevator that is suitable and may be used for automated transferring of passengers between landings in response to service requests.

Figure 1A:
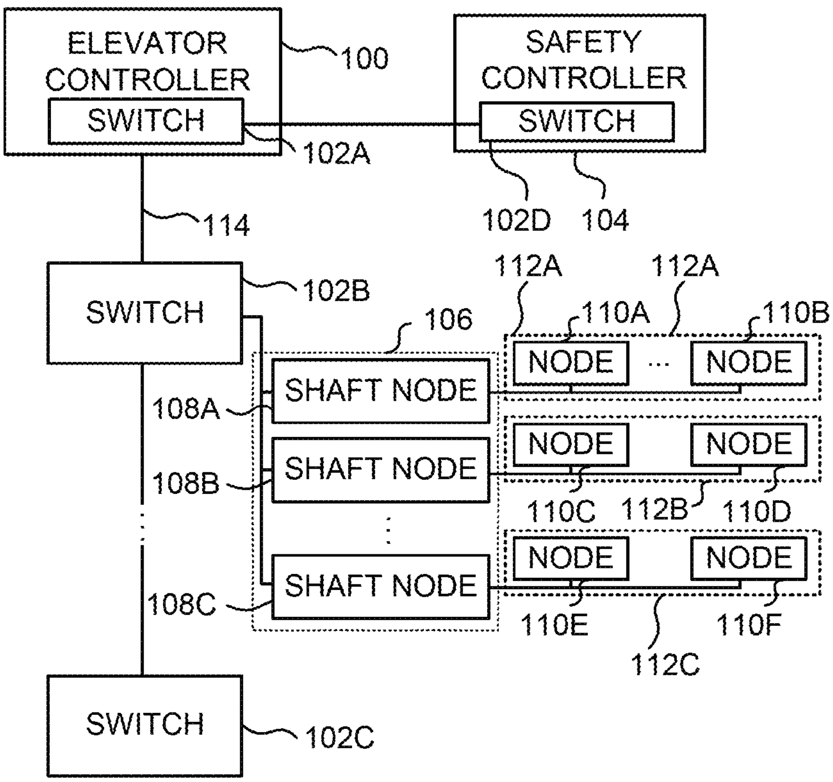
FIG. 1A illustrates an elevator communication system according to an example embodiment.

FIG. 1A illustrates an elevator communication system according to another example embodiment. The elevator communication system comprises an elevator controller 100. The elevator communication system may further comprise one or more multi-drop ethernet bus segments 112A, 112B, 112C reachable by the elevator controller 100, and a plurality of elevator system nodes 108A-108C, 110A-110F configured to communicate via the multi-drop ethernet bus segments 112A, 112B, 112C wherein the elevator controller 100 is reachable by the elevator system nodes 110A-110F via the multi-drop ethernet bus segments 112A, 112B, 112C.

In an example embodiment, the elevator communication system may comprise a point-to-point ethernet bus 114 and at least one connecting unit 102A, 102C comprising a first port connected to the multi-drop ethernet bus segment 106 and a second port connected to the point-to-point ethernet bus 114. Thus, by using the connecting units 102B, 102C one or more multi-drop ethernet bus segments 106 may be connected to the point-to-point ethernet bus 114. The connecting unit 102B, 102C may refer, for example, to a switch, a hub or a router. Similarly, the elevator controller 100 may comprise a switch 102A, which connects the elevator controller 100 to the point-to-point ethernet bus 114. The point-to-point ethernet bus 114 may be, for example, 100BASE-TX or 10BASET1L point-to-point ethernet bus. The multi-drop ethernet bus segments 106, 112A, 112B, 112C may comprise, for example, 10BASE-T1S multi-drop ethernet bus.

The elevator communication system may comprise a safety controller 104. The safety controller 104 may be connected to the point-to-point ethernet bus 114 via a connecting unit 102D. This means that the elevator system nodes 108A-108C, 110A-110F may send information to the elevator safety controller 100 and vice versa via the common point-to-point ethernet bus 114. For example, the elevator system nodes 108A-108C, 110A-110F may send information, for example, from sensors or fixtures to the elevator controller 114 or the safety controller 104 and receive information therefrom to control, for example, actuators configure fixtures etc. At least some of the elevator system nodes 108A-108C, 110A-110F may be safety nodes in accordance with IEC61508 SIL level 3, having a safety processing unit and a separate communication controller. Data of the safety processing unit may be sent only to the safety controller 104. The safety nodes may be configured to interface with elevator safety devices, such as safety sensors or safety contacts indicating elevator safety, for example, landing door contacts, door lock contacts, contact of overspeed governor, buffer contacts etc. The safety nodes may be configured to communicate with the elevator safety controller 104. To establish safe communication, different kind of data checks, such as checksums, error detection and/or correction algorithms etc. may be used in the communication.

As illustrated in FIG. 1A, the shaft nodes 108A, 108B, 108C interconnect the shaft segment 106B to which the shaft nodes 108A, 108B, 108C are connected to and the landing segments 112A, 112B, 112C. In other words, the shaft nodes 108A, 108B, 108C may comprise or may act as a switch to the landing segments 112A, 112B, 112C. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

In an example embodiment, an elevator system node 110A-110F may be configured to interface with at least one of an elevator fixture, an elevator sensor, an elevator safety device, and an elevator control device. Further, in an example embodiment, power to the nodes may be provided with the same cabling.

The elevator safety system may further comprise an elevator system component and an actuator for causing a change in the status of the elevator system component. In an example embodiment, the elevator system component may comprises, for example, of a hoisting machine, a hoisting machine brake, a car brake, a brake control unit, a landing door, a car door, a pit buffer, an overspeed governor, or a pre-triggered safety device. Further, in an example embodiment, the actuator may comprise, for example, a hoisting motor, an electromagnet of a hoisting machine brake, a door operator or a manual actuator. The elevator safety system may further comprise a sensor configured to indicate a change in the status of the elevator system component. The sensor may comprise, for example, a current sensor, a voltage sensor, an encoder, an inductive proximity sensor, a hall sensor, a reed switch, and a safety contact.

Figure 1B:
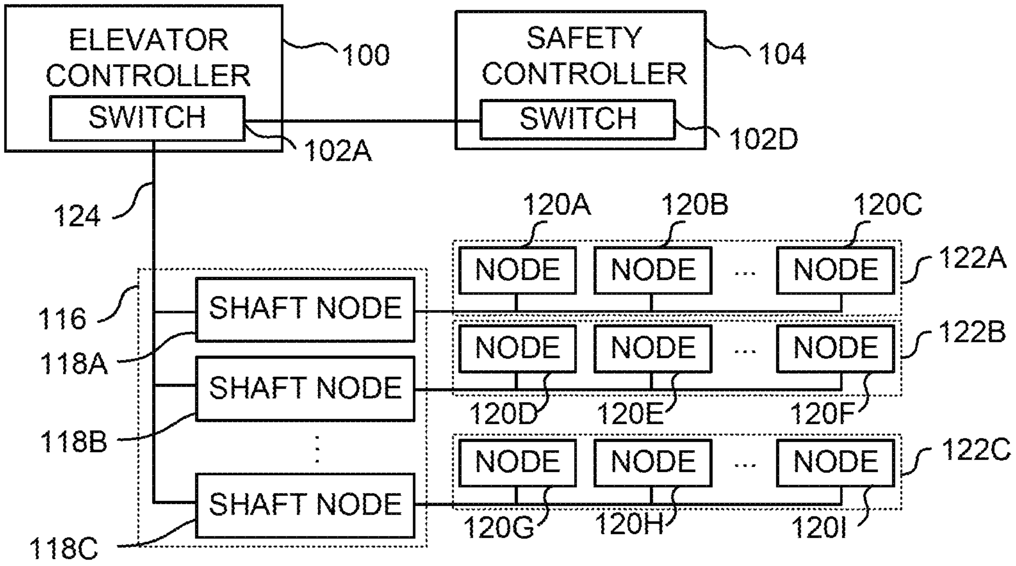
FIG. 1B illustrates an elevator communication system according to another example embodiment.

FIG. 1B illustrates an elevator communication system according to another example embodiment. The elevator communication system comprises an elevator controller 100. The elevator communication system may further comprise a multi-drop ethernet bus 124 comprising a multi-drop ethernet bus segment 116 (for example, in the form of 10BASE-T1S) forming a shaft segment reachable by the elevator controller 100. The shaft segment 116 comprises shaft nodes 118A, 118B, 118C configured to communicate via the multi-drop ethernet bus segment 116.

Elevator system nodes 120A, 120B, 120C, i.e. landing nodes, are connected to a multi-drop ethernet bus segment 122A, i.e. to a landing segment. Similarly, elevator system nodes 120D, 120E, 120F are connected to a multi-drop ethernet bus segment 122B, and elevator system nodes 120G, 120H, 120I are connected to a multi-drop ethernet bus segment 122C. Landing nodes that are coupled to the same multi-drop ethernet bus segment may be configured so that one landing node is to be active at a time while the other landing nodes of the same multi-drop ethernet bus segment are in a high-impedance state.

In an example embodiment, the landing node 120A-120I may be configured to interface with at least one of an elevator fixture, an elevator sensor, an elevator safety device, and an elevator control device. Further, in an example embodiment, power to the nodes may be provided with the same cabling.

The elevator communication system may comprise a safety controller 104. The safety controller 104 may be connected to the elevator controller 100. For example, the elevator system nodes 118A-118C, 120A-120I may send information, for example, from sensors or fixtures to the elevator controller 104 or the safety controller 104 and receive information therefrom to control, for example, actuators configure fixtures etc. At least some of the elevator system nodes 118A-118C, 120A-120I may be safety nodes in accordance with IEC61508 SIL level 3, having a safety processing unit and a separate communication controller. Data of the safety processing unit may be sent only to the safety controller 104. The safety nodes may be configured to interface with elevator safety devices, such as safety sensors or safety contacts indicating elevator safety, e.g. landing door contacts, door lock contacts, contact of overspeed governor, buffer contacts etc. The safety nodes may be configured to communicate with the elevator safety controller 104. To establish safe communication, different kind of data checks, such as checksums, error detection and/or correction algorithms etc. may be used in the communication.

As illustrated in FIG. 1B, the shaft nodes 118A, 118B, 118C interconnect the shaft segment 116 to which the shaft nodes 118A, 118B, 118C are connected to and the landing segments 122A, 122B, 122C. In other words, the shaft nodes 118A, 118B, 118C may comprise or may act as a switch to the landing segments 122A, 122B, 122C. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

The elevator safety system may further comprise an elevator system component and an actuator for causing a change in the status of the elevator system component. In an example embodiment, the elevator system component may comprises, for example, of a hoisting machine, a hoisting machine brake, a car brake, a brake control unit, a landing door, a car door, a pit buffer, an overspeed governor, or a pre-triggered safety device. Further, in an example embodiment, the actuator may comprise, for example, a hoisting motor, an electromagnet of a hoisting machine brake, a door operator or a manual actuator. The elevator safety system may further comprise a sensor configured to indicate a change in the status of the elevator system component. The sensor may comprise, for example, a current sensor, a voltage sensor, an encoder, an inductive proximity sensor, a hall sensor, a reed switch, and a safety contact.

Figure 2:
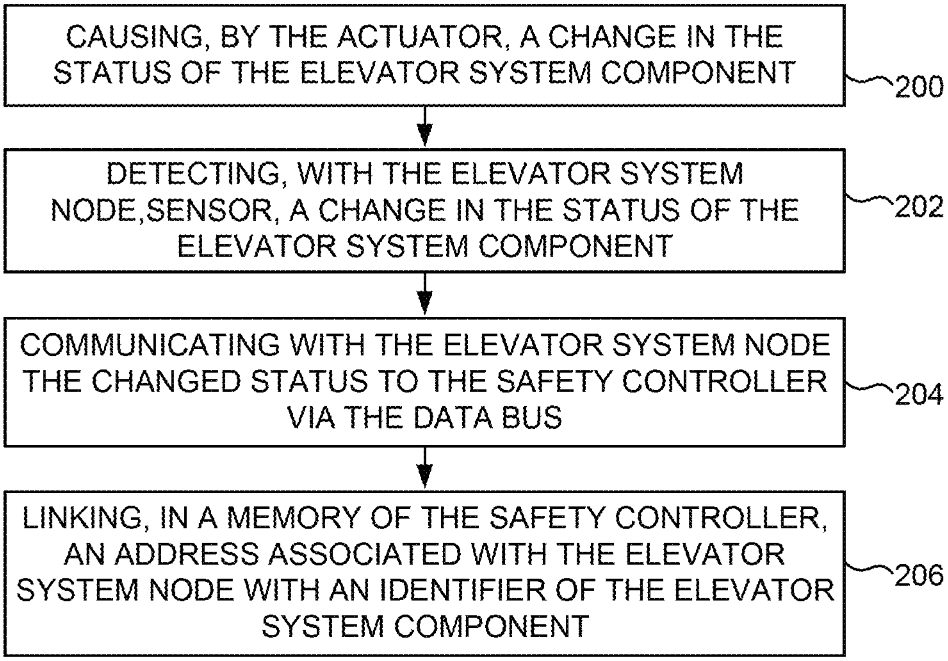
FIG. 2 illustrates a method for setting up an elevator safety system according to an example embodiment.

FIG. 2 illustrates a method for setting up an elevator safety system according to an example embodiment. The method may be implemented, for example, in the elevator communication system discussed in FIGS. 1A and 1B and their description.

The elevator safety system comprises an elevator system component, an actuator for causing a change in the status of the elevator system component, a data bus 114, 124, a safety controller 104 configured to communicate via the data bus 114, 124, a sensor configured to indicate a change in the status of the elevator system component, and an elevator system node 108A-108C, 110A-110F, 120A-120I associated with the sensor configured to communicate via the data bus 114, 124. The elevator system node 108A-108C, 110A-110F, 120A-120I is configured to communicate a change in the status of the elevator system component to the safety controller 104 via the data bus 114, 124.

At 200, the actuator causes a change in the status of the elevator system component. As illustrated above, the actuator may comprise, for example, a hoisting motor, an electromagnet of a hoisting machine brake, a door operator and a manual actuator. In an example embodiment, the manual actuator may be operated by a service person. For example, the service person may receive a request to his mobile device to manually operate an elevator system element, for example, a landing door or a brake.

At 202 it is detected with the sensor a change in the status of the elevator system component.

At 204 the changed status is communicated with the elevator system node to the safety controller via the data bus.

At 206 the safety controller 104 links in a memory of the safety controller 104 an address associated with the elevator system node with an identifier of the elevator system component. In an example embodiment, the identifier comprises an address of the elevator system component.

At least some of the above discussed example embodiments enables a reliable solution to link various elevator system components to an elevator system node connected to the data bus. This enables an easy and a highly-automated configuration of a new kind of elevator control system. In this new highly reliable and safe elevator control system a plurality of elevator system components are connected to a common data bus, in particular an ethernet bus, via respective elevator system nodes, such that they are reachable by the elevator control or the elevator safety control. A high degree of automation in the configuration process reduces the risk of a human error, and improves reliability and elevator safety.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for setting up an elevator safety system, the elevator safety system comprising an elevator system component, an actuator for causing a change in a status of the elevator system component, a data bus, a safety controller configured to communicate via the data bus, a sensor configured to indicate the change in the status of the elevator system component, and an elevator system node associated with the sensor and configured to communicate via the data bus, wherein the elevator system node is configured to communicate the change in the status of the elevator system component to the safety controller via the data bus, the method comprising:

causing, by the actuator, the change in the status of the elevator system component, detecting, with the sensor, the change in the status of the elevator system component, the detecting including generating, at the sensor, information indicating the change in the status of the elevator system component, communicating, with the elevator system node, the information indicating the change in the status of the elevator system component to the safety controller via the data bus, and linking, in a memory of the safety controller and subsequently to the communicating the information indicating the change in the status of the elevator system component to the safety controller, an address associated with the elevator system node with an identifier of the elevator system component.

2. The method of claim 1, wherein the elevator system component comprises one of a hoisting machine, a hoisting machine brake, a car brake, a brake control unit, a landing door, a car door, a pit buffer, an overspeed governor, and a pre-triggered safety device.

3. The method of claim 1, wherein the actuator comprises one of a hoisting motor, an electromagnet of a hoisting machine brake, a door operator and a manual actuator.

4. The method of claim 1, wherein the sensor comprises one of a current sensor, a voltage sensor, an encoder, an inductive proximity sensor, a hall sensor, a reed switch, and a safety contact.

5. The method of claim 1, wherein the identifier comprises an address of the elevator system component.

6. The method of claim 1, wherein the data bus comprises an ethernet bus.

7. The method of claim 1, wherein the elevator safety system further comprises at least one multi-drop ethernet bus segment communicatively connected to the data bus and wherein the data bus comprises a point-to-point ethernet bus, wherein the elevator system node is communicatively connected to the point-to-point ethernet bus via the at least one multi-drop ethernet bus segment.

8. An elevator safety system comprising:

an elevator system component, an actuator configured to cause a change in a status of the elevator system component, a data bus, a safety controller configured to communicate via the data bus, a sensor configured to detect in the status of the elevator system component, the detecting including generating, at the sensor, information indicating the change in the status of the elevator system component, and an elevator system node associated with the sensor, the elevator system node configured to communicate the information indicating the change in the status of the elevator system component to the safety controller via the data bus, wherein the safety controller is configured to link, in a memory of the safety controller and subsequently to the information being communicated to the safety controller, an address associated with the elevator system node with an identifier of the elevator system component.

9. The elevator safety system of claim 8, wherein the elevator system component comprises one of a hoisting machine, a hoisting machine brake, a car brake, a brake control unit, a landing door, a car door, a pit buffer, an overspeed governor, and a pre-triggered safety device.

10. The elevator safety system of claim 8, wherein the actuator comprises one of a hoisting motor, an electromagnet of a hoisting machine brake, a door operator, and a manual actuator.

11. The elevator safety system of claim 8, wherein the sensor comprises one of a current sensor, a voltage sensor, an encoder, an inductive proximity sensor, a hall sensor, a reed switch, and a safety contact.

12. The elevator safety system of claim 8, wherein the identifier comprises an address of the elevator system component.

13. The elevator safety system of claim 8, wherein the data bus comprises an ethernet bus.

14. The elevator safety system of claim 8, wherein the elevator safety system further comprises at least one multi-drop ethernet bus segment communicatively connected to the data bus and wherein the data bus comprises a point-to-point ethernet bus, wherein the elevator system node is communicatively connected to the point-to-point ethernet bus via the at least one multi-drop ethernet bus segment.

* * * * *